(12) United States Patent
Chien et al.

(10) Patent No.: US 6,466,307 B2
(45) Date of Patent: Oct. 15, 2002

(54) LASER RANGE SIGNAL PROCESSING METHOD AND DEVICE

(75) Inventors: Pi-Yao Chien; Rui-Feng Huang, both of Taichung; Chih-Wei Hung, Nan Tou Hsien; I-Jen Lai, Taichung, all of (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 09/775,503

(22) Filed: Feb. 5, 2001

(65) Prior Publication Data

US 2002/0041370 A1 Apr. 11, 2002

(30) Foreign Application Priority Data

Aug. 17, 2000 (TW) .......................... 89116602 A

(51) Int. Cl.[7] .............................................. G01C 3/08
(52) U.S. Cl. ..................... 356/5.03; 356/5.01
(58) Field of Search ................. 356/3.017, 5.15, 356/5.01, 5.03; 342/96

(56) References Cited

U.S. PATENT DOCUMENTS

| | | | | |
|---|---|---|---|---|
| 3,848,999 A | * | 11/1974 | Dall'Armi | 356/4 |
| 3,941,483 A | * | 3/1976 | Ferrin | 356/152 |
| 4,070,673 A | * | 1/1978 | Schmidt et al. | 343/7.3 |
| 4,259,592 A | * | 3/1981 | Frungel et al. | 250/574 |
| 4,518,256 A | * | 5/1985 | Schwartz | 356/5 |
| 4,657,382 A | * | 4/1987 | Busujima et al. | 356/4 |
| 5,144,316 A | * | 9/1992 | Uhlmann et al. | 342/189 |
| 5,612,779 A | * | 3/1997 | Dunne | 356/5.01 |
| 5,760,887 A | * | 6/1998 | Fink et al. | 356/5.03 |
| 5,912,728 A | * | 6/1999 | Besesty et al. | 356/5.01 |
| 6,137,566 A | * | 10/2000 | Leonard et al. | 356/141.1 |

\* cited by examiner

*Primary Examiner*—Thomas H. Tarcza
*Assistant Examiner*—Brian Andrea
(74) *Attorney, Agent, or Firm*—Browdy and Neimark, P.L.L.C.

(57) ABSTRACT

A laser range signal-processing device comprises a timing interval generator, a microprocessor unit, a programmable delay unit, a laser transmitter, a laser receiver, a high gain amplifier circuit and a memory. A signal-processing method of the laser range finder includes a first step in which the measurement block number and the laser emission time are set up. Thereafter, the sampling of the laser reflection signal of each block is done in sequence so as to determine a block in which an object is located. A laser beam of a predetermined delay time is emitted to the block in which the object is located. The reflective laser signals are sampled and processed to attain a precise distance between the laser range finder and the object.

10 Claims, 9 Drawing Sheets

LASER RANGE SIGNAL PROCESSING METHOD AND DEVICE

FIELD OF THE INVENTION

The present invention relates generally to a laser range finder, and more particularly to a method and a device for enhancing the precision without increasing sampling frequencies and economizing the use of the memory of the laser range finder.

BACKGROUND OF THE INVENTION

The conventional laser range finder emits the laser pulse in the range of 10 ns to 20 ns at an object which reflects back a laser signal. The laser signal is received by a laser receiver. The range is calculated by a formula as follows:

$$T_d = 2L/C \quad (1)$$

The letter "L" of the formula (1) stands for the distance between the laser range finder and the object; "C", speed of light; "$T_d$", time difference between the emitted laser pulse and the received laser pulse. The range can be calculated with precision by measuring $T_d$ on the basis of the above formula (1). The precision measurement of Td can be attained by enhancing the laser emitting power, or by eliminating the noise signal which is brought about by the sunlight and is received by the receiver. The U.S. Pat. No. 3,644,740 discloses a receiving circuit for obtaining an error warning by controlling the circuit bias of the receiving circuit, so as to improve the signal-noise ratio of the receiving circuit. The U.S. Pat. No. 4,569,599 discloses a counting control technique for detecting a range signal. The U.S. Pat. No. 4,770,526 discloses a technique for increasing the range detection value by amplifying the time delay signal. The U.S. Pat. No. 3,959,641 discloses a digital measurement technique for reducing the critical voltage of the laser receiver so as to enhance the range measurement. The U.S. Pat. No. 5,612,779 discloses a technique to adjust a threshold voltage automatically such that the threshold voltage is variable in response to the strength of the reflection signal of an object. As a result, a threshold voltage can be set between the noise signal and the object signal under various circumstances. Such prior art techniques as described above are intended to increase the range of measurement as well as the precision of measurement.

The conventional way for enhancing the reception capability and the measurement precision of a laser range finder involves the use of the high speed sampling statistical method and an increase in the sampling frequency, thereby enabling the sampling time point to be close to the time point of the actual reception of the laser signal. The precision range calculation is attained on the basis of the time point data. However, the sampling method is not cost-effective in view of the fact that a memory with a large storage capacity is needed for recording a number of the sampling reference points. Once more sampling frequency, then the more memory is needed. In addition, the high sampling frequency must be done by a high-speed element which consumes a great deal of electricity and costs expensively.

SUMMARY OF THE INVENTION

The primary objective of the present invention is to provide a method and a device for enhancing the precision of a laser range finder without an increase in the sampling frequency between the identical range finding blocks.

It is another objective of the present invention to provide a method and a device for reducing the need of large storage capacity of a memory by dividing a plurality of measurement blocks between the identical range finding blocks.

The method of the present invention includes a first step in which the measurement block number and the laser emission time are set up. Thereafter, the sampling of the laser reflection signal of each block is done in sequence, beginning from the first block, so as to determine a block in which an object is located. A laser beam of a predetermined delay time is emitted to the block in which the object is located. The reflective laser signals are sampled and processed to calculate a precise distance between the laser range finder and the object.

The device of the present invention comprises a timing interval generator, a microprocessor unit, a programmable delay unit, a laser transmitter, a laser receiver, a high gain amplifier circuit and a memory. The programmable delay unit and the microprocessor unit are used to control the time of the delay emission of the laser signal, thereby resulting in the time difference of the relative range signals.

DETAILED DESCRIPTION OF THE INVENTION

As shown in FIGS. 1–6, a method embodied in the present invention is intended to process the signal of a laser range finder and is composed of the following steps:

(A) Setting measurement area block numbers and laser emission times:

Divide the total sampling time $T_T$ of the laser range into four blocks and set up each block to emit laser beam ten times.

Figure 1:
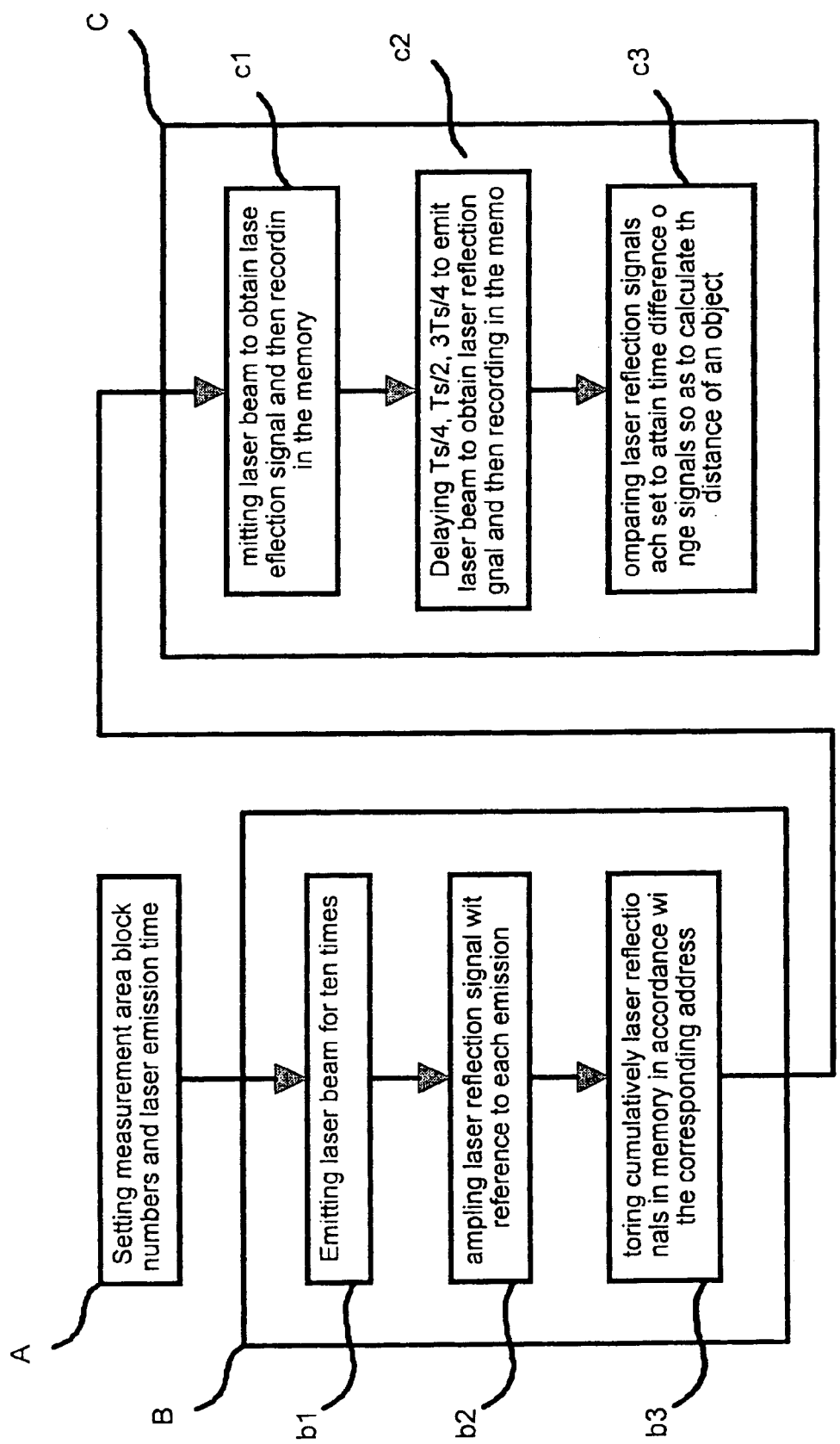
FIG. 1 shows a block diagram of a preferred embodiment of the present invention.
Figure 2:
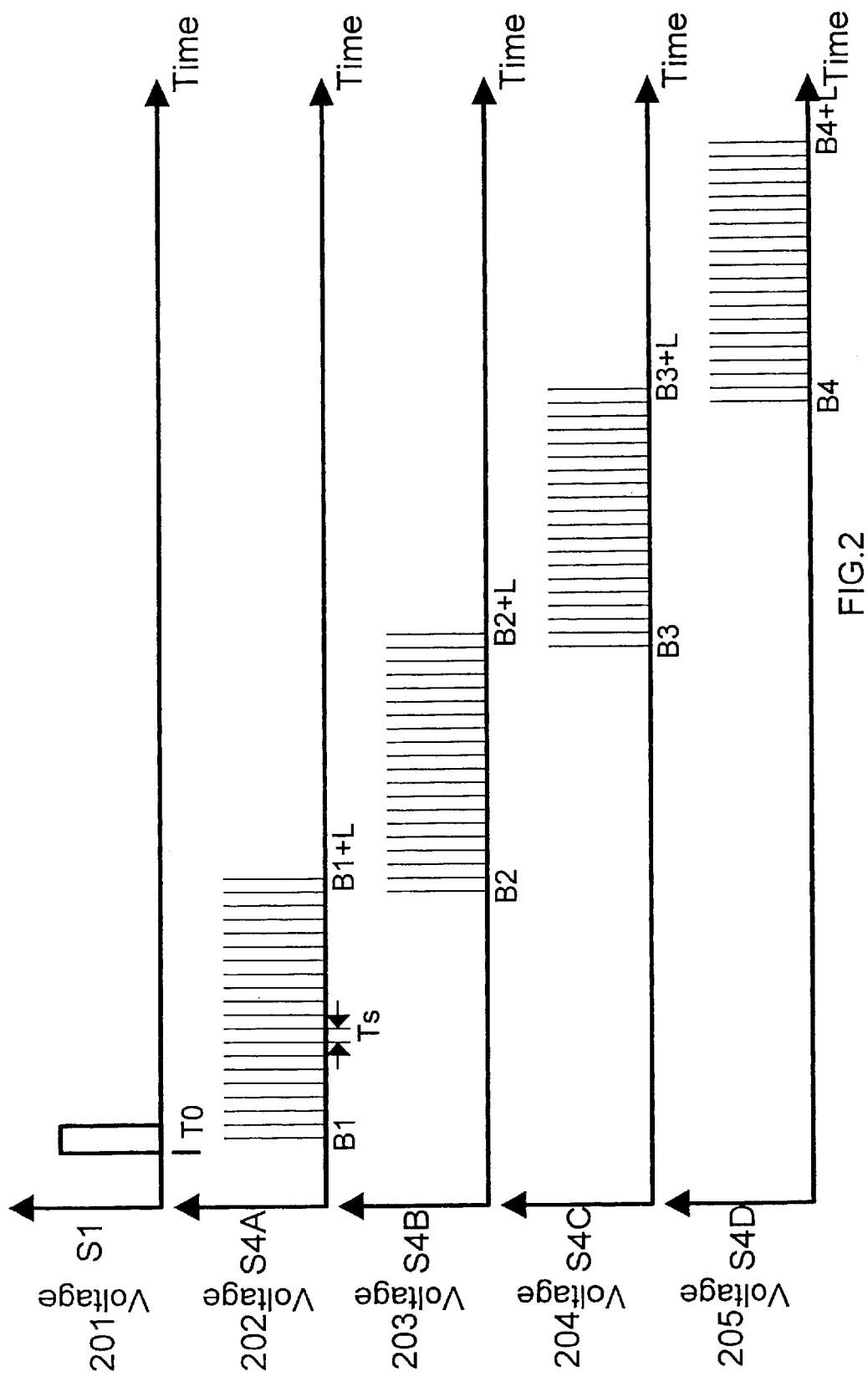
FIG. 2 shows a schematic view of area block sampling of the preferred embodiment of the present invention.

(B) As shown in FIG. 2, beginning from the first measurement block, the laser reflection signal samples are taken sequentially in each block for finding out which block is the location of the object.

b1. Using the laser transmitter to emit laser beam for ten times;

b2. In each emission, obtain the laser reflection signal by sampling continually by the sampling frequency Ts. The laser reflection signal may be the laser signal reflected by the object, or the noise signal;

b3. Storing cumulatively laser reflection signals in memory in accordance with the correspondence address.

In the step (B), among the ten times of emission, the noise signal is not likely to appear in a fixed position. By means of the statistical and related calculations, it can be determined if the object is located in this block.

Figure 3:
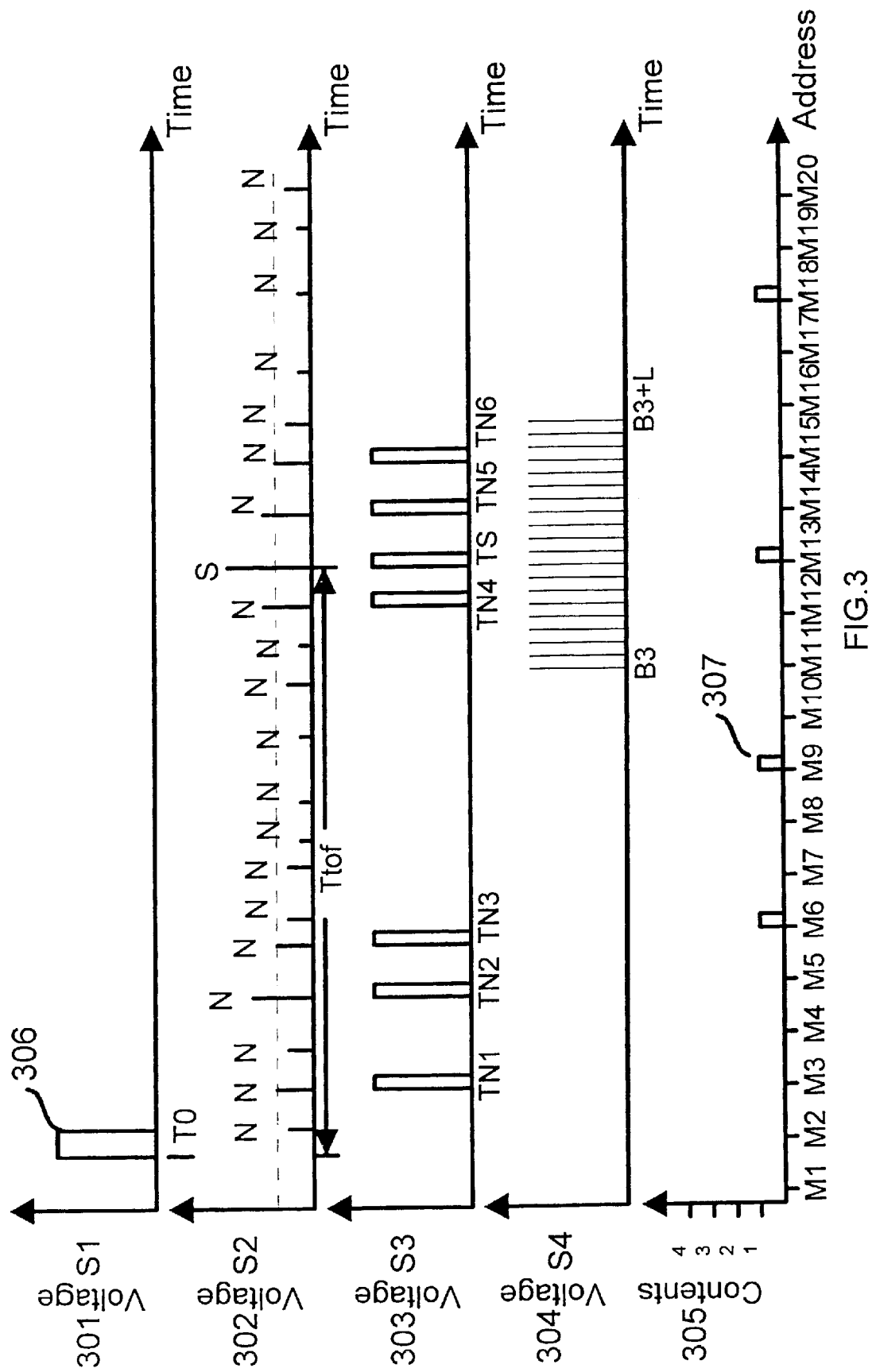
FIG. 3 shows a sampling description of the third area block in which an object is located according to the preferred embodiment of the present invention.
Figure 4:
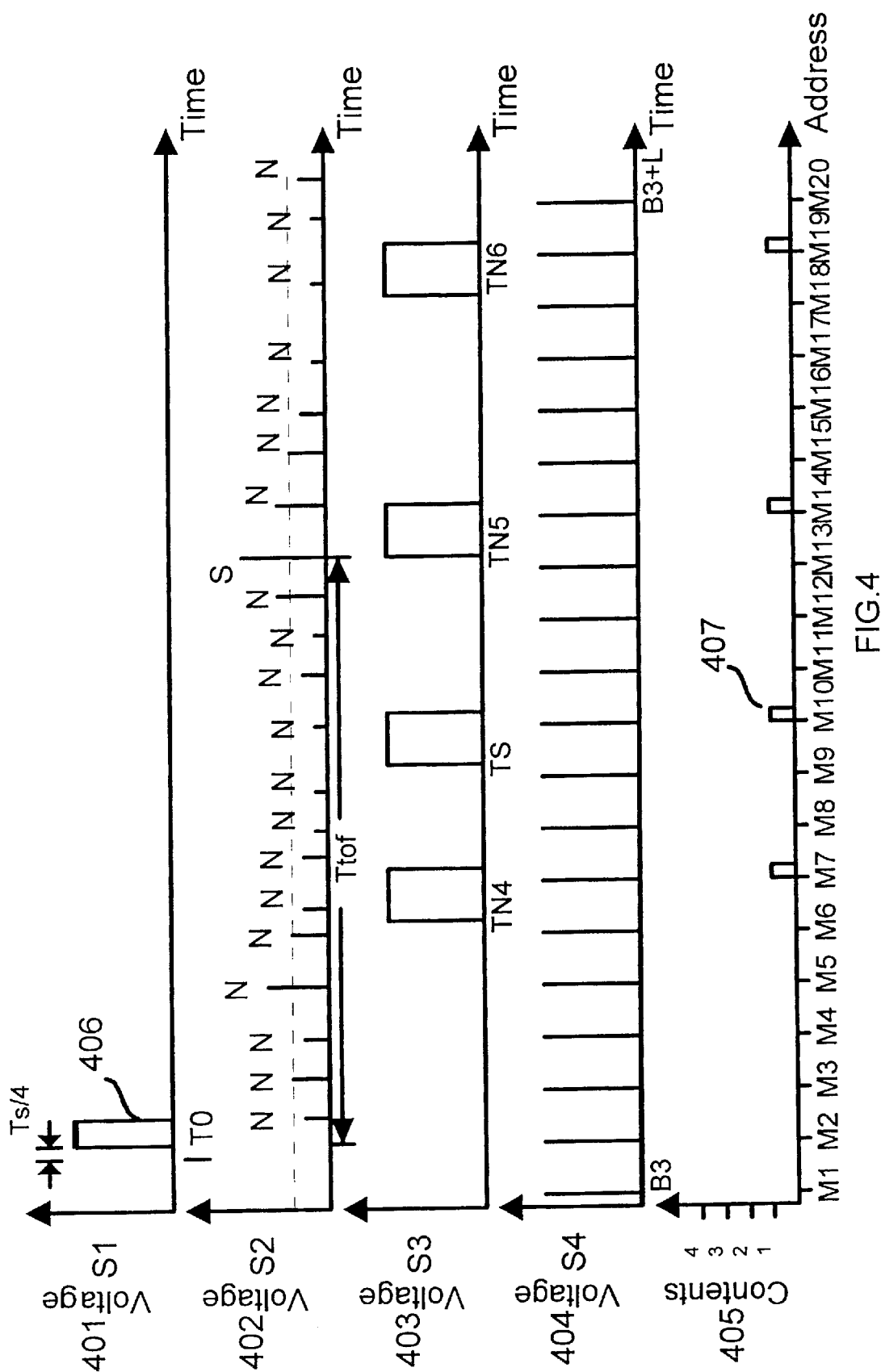
FIG. 4 shows another sampling view of the preferred embodiment of the present invention to show the sampling state after laser emission of delay time Ts/4.
Figure 5:
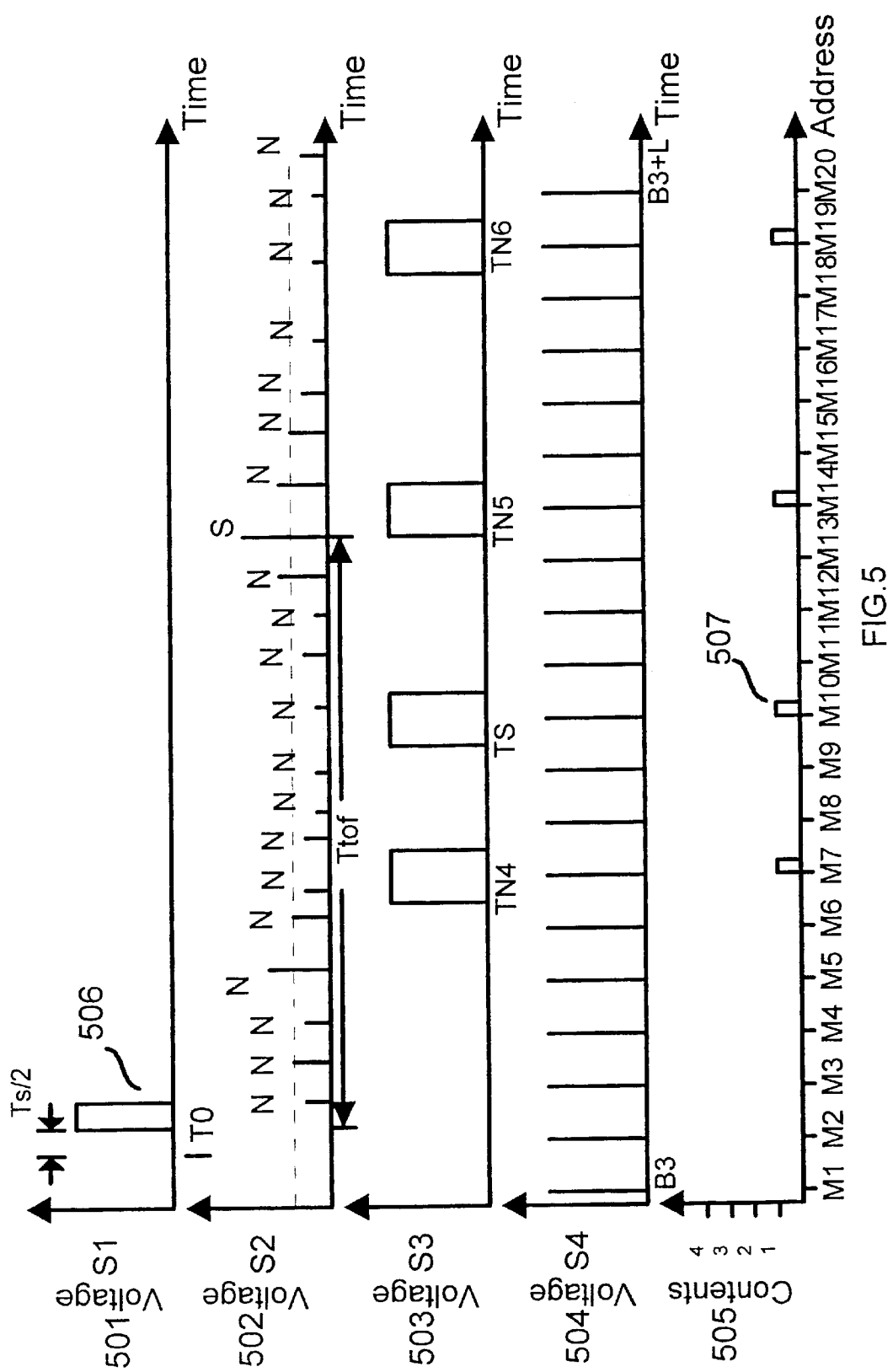
FIG. 5 shows another sampling view of the preferred embodiment of the present invention to show the sampling state after laser emission of delay time Ts/2.
Figure 6:
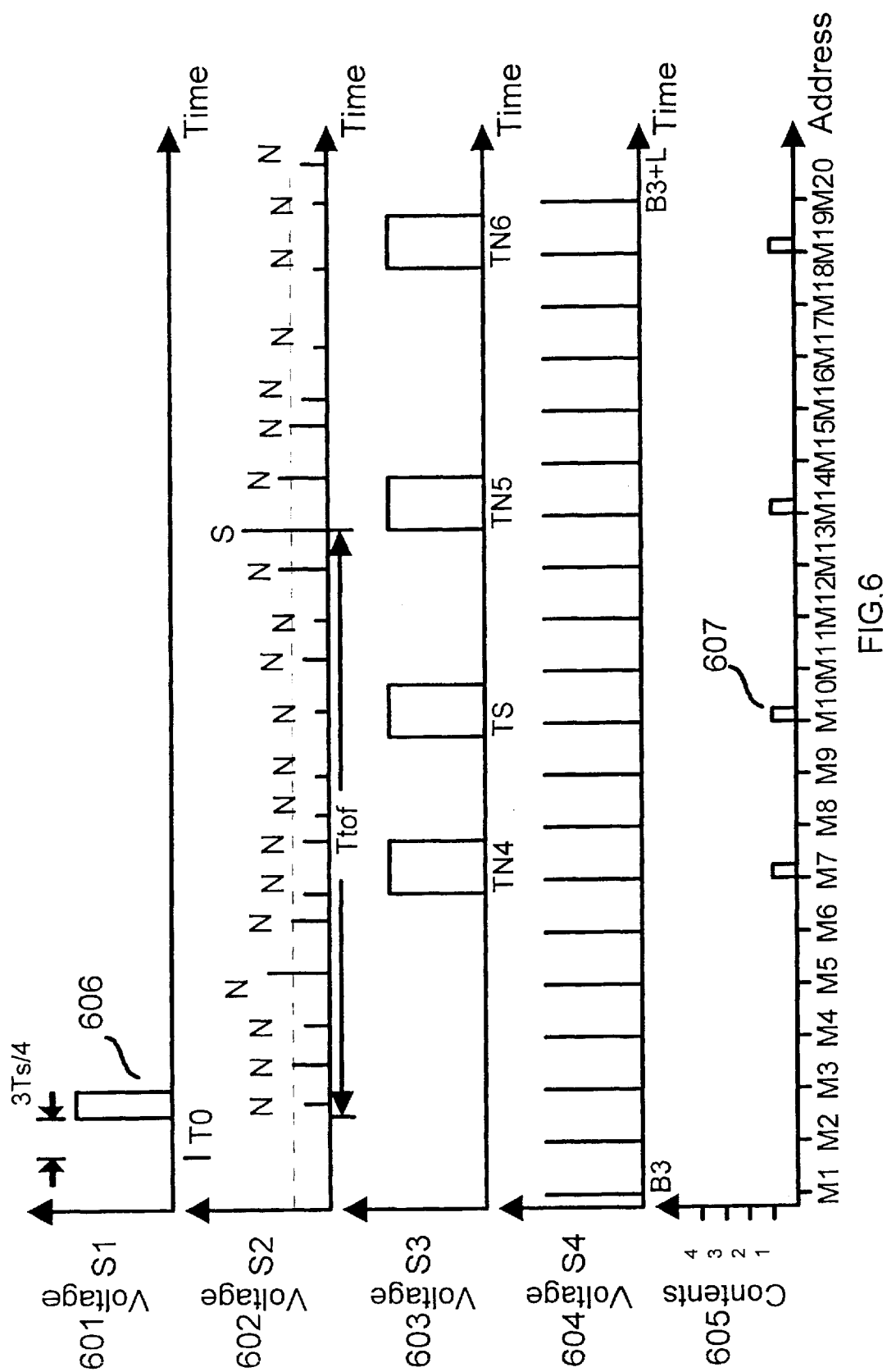
FIG. 6 shows another sampling view of the preferred embodiment of the present invention to show the sampling state after laser emission of delay time 3Ts/4.

(C). In the block in which the object is located, emit the laser beam of a predetermined delay time. The laser reflection signal is processed to determine the distance between the laser range finder and the object.

c1. Emitting laser beam to obtain laser reflection signal and recording it in the memory, as shown in FIG. 3 in which the emission laser beam 301, the laser reflection signal 302, the signal 303 greater than a predetermined strength, the sample signal 304 of the third block and the distance signal corresponding position 305 in the memory;

c2. Delay Ts/4 time to emit the laser beam to obtain the laser reflection signal, as shown in FIG. 4, in which 403 denotes the signal of the third block, 404 denotes the sampling signal of the third block, 405 denotes the distance signal corresponding position in the memory. Emitting the laser beam repeated at Ts/4 time. The memory position M10 of the signal location is obtained by the statistical method and correlativity;

Further delay Ts/2 time to emit the laser beam, and then obtain the laser reflection signal, as shown in FIG. 5. The memory position M10 of the signal location is obtained by the statistical method and correlativity;

Further delay 3Ts/4 time to emit the laser beam, and then obtain the laser reflection signal as shown in FIG. 6. The memory position M10 of the signal location is obtained by statistics and correlativity.

c3. Compare 305, 405, 505, 605 in FIGS. 3–6 and then induct the time difference of the range signal as (B3+8)×Ts of FIG. 3, and the time difference of the range signal as (B3+9)×Ts of FIGS. 4–6. "$B_3$" denotes the third block.

The range is calculated by using the signals of nondelay, delay Ts/4 time, delay Ts/2 time, delay 3Ts/4 time and the following formula (2):

$$L = \left[ 4B_K + \sum_{d=0}^{3} M(d) \right] \times \frac{T_S}{4} \times \frac{C}{2} - \Delta L \quad (2)$$

The letter "$B_k$" of the formula (2) stands for the initial position of the Kth block ; "M(d)", measure data for the dth delay; "Ts", the sampling period; "C", light speed; "$\Delta L$", range correction quantity.

For this example, we can compute the distance as below.

$$L = (4 \times B3 + 8 + 9 + 9 + 9) \times Ts/4 \times C/2 - \Delta L \quad (3)$$

As a result, the range L between the object and the laser range finder can be attained by computation.

Figure 7:
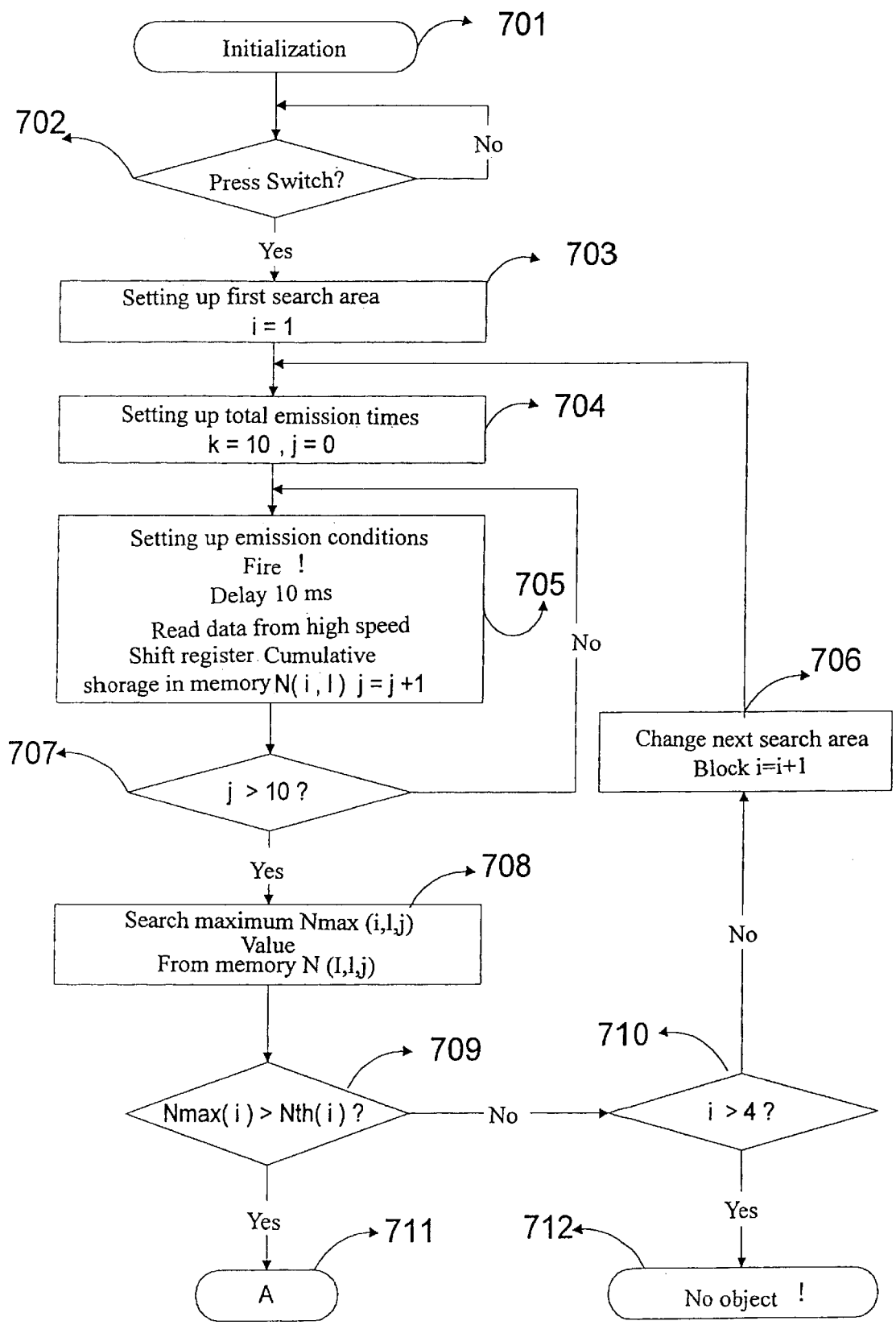
FIG. 7 shows a process flow chart about step B of the preferred embodiment of the present invention.

As illustrated in FIG. 7 about step B, the numeral "704" designates the emission time as 10 times, whereas the numerals 708–712 designate the comparision between the cumulative value and the maximum value. It can be therefore determined if the object is located in the block.

Figure 8:
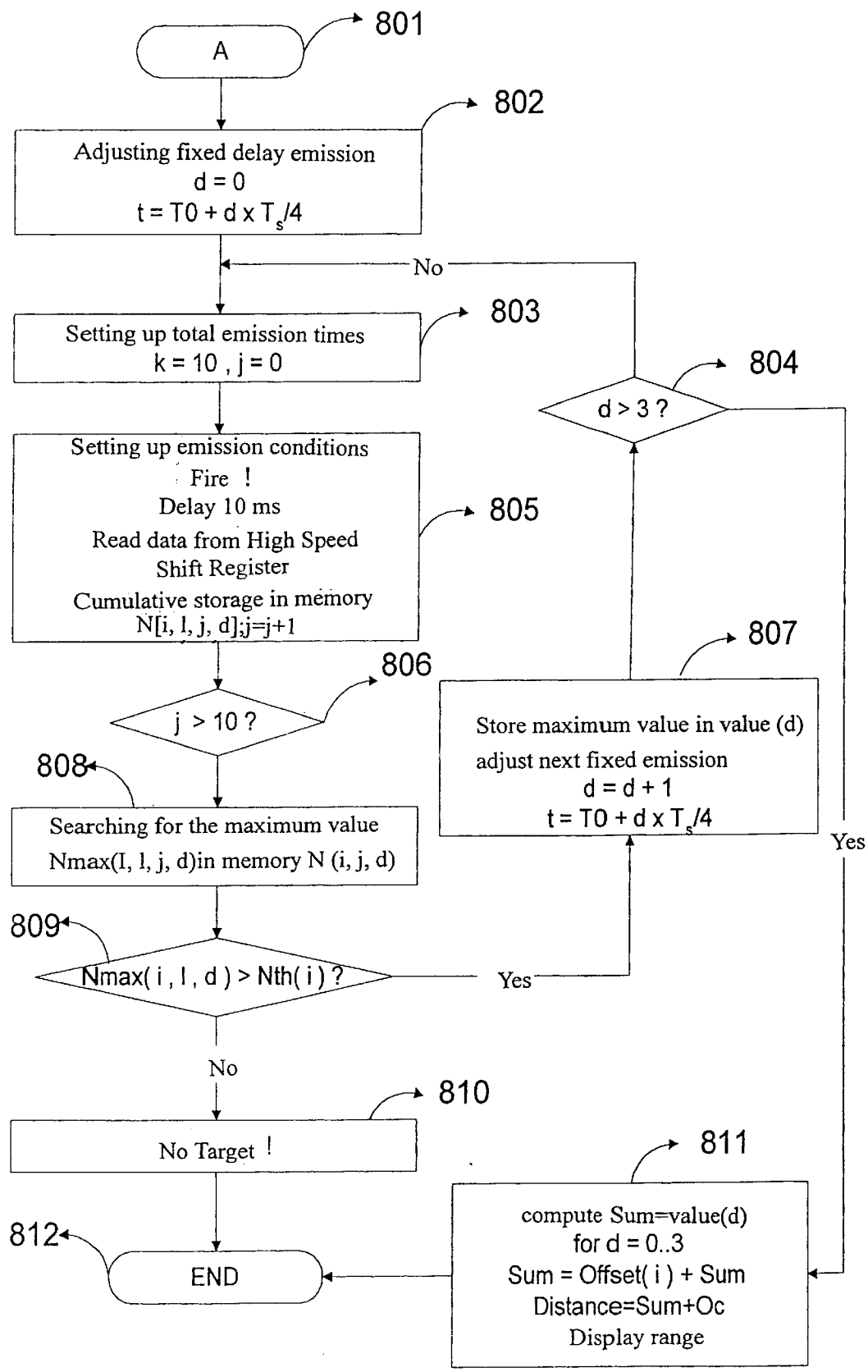
FIG. 8 shows another process flow chart about step C of the preferred embodiment of the present invention.

As illustrated in FIG. 8 about step C, the numeral 802 designates the setting delay time while the numeral 803 designates the setting emission times. The numeral 809 denotes the position of the object in the block. The numeral 811 denotes the object range obtained by using the formula (2).

Figure 9:
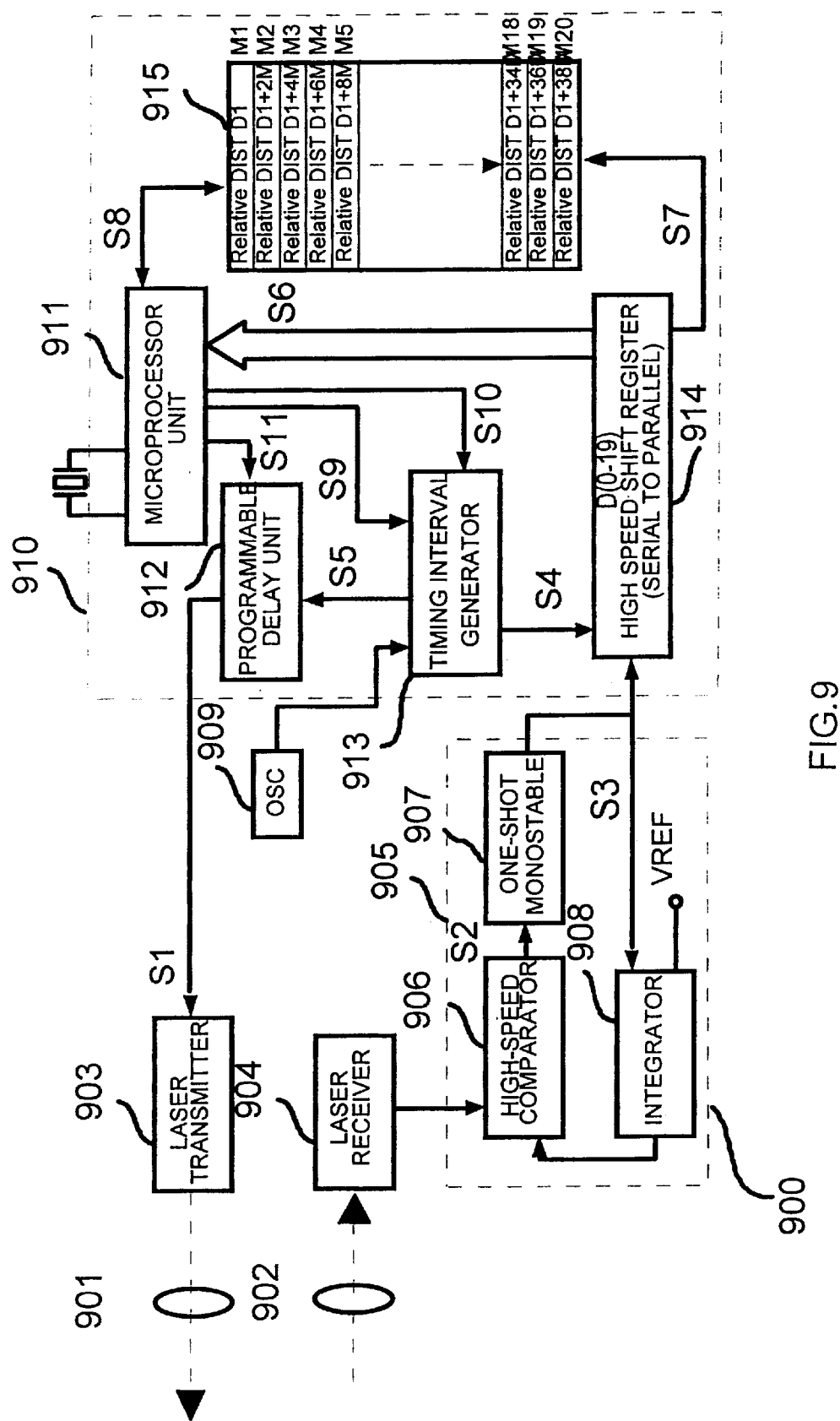
FIG. 9 shows a circuit block diagram of the preferred embodiment of the present invention.

As shown in FIG. 9, a laser range finder 900 of the present invention comprises a timing interval generator 913, a microprocessor unit 911, a programmable delay unit 912, a laser transmitter 903, a laser receiver 904, a high gain amplifier circuit 905 and a memory 915.

The timing interval generator 913 is used to generate the system timing measurement block and the signal of the time pulse sampling period Ts.

The programmable delay unit 912 is connected with the microprocessor unit 911 and is controlled by the microprocessor unit 911 to determine if it is necessary to transmit the delay control signal and the delay time.

The laser transmitter 903 is connected with and controlled by the programmable delay unit 912 to emit a predetermined delay laser beam.

The laser receiver 904 is used to receive the reflected laser signal.

The high gain amplifier circuit 905 is connected with the laser receiver 904 for comparing, amplifying and tuning the signal received by the laser receiver (904).

A high speed shift register 914 is connected with the high gain amplifier circuit 905 and the timing interval generator 913 for storing rapidly the signal of the high gain amplifier circuit 905.

The memory 915 is connected with the microprocessor unit 911 and the high speed shift register 914. The data of the high speed shift register 914 are computed and cumulated by the microprocessor unit 911, so as to be stored in the memory 915.

The laser transmitter 903 is controlled by the microprocessor unit 911 to emit a laser beam aiming at an object. The laser reflection signal from the object and the noise signal are received by the laser receiver 904. A signal greater than a predetermined strength is shaped by the high gain amplifier circuit 905, as shown in FIG. 3, in which TN1-6 are noise signals; TS, object signal. The sampling is done by the sampling period Ts, which is read into the high speed shift register 914 and stored sequentially and cumulatively in the memory 915, as illustrated in FIG. 3. When the delay is called for, the microprocessor unit sets up the delay time of the delay unit as Ts/4, Ts/2 and 3Ts/4, so as to control the laser transmitter to delay the emitting of laser beam, thereby resulting in a time difference of the received range signal. The range is calculated by the method as described above.

What is claimed is:

1. A signal processing method of a laser range signal, said signal processing method comprising the steps of:

(A) dividing a total sampling time $T_t$ of the laser range finder into a plurality of blocks and setting a total numbers of times by which a laser beam is emitted at each of the blocks;

(B) determining a block in which an object is located by sampling sequentially laser signals reflected from the blocks; and (C) emitting at a predetermined delay time a laser beam at a block in which the object is located, thereby resulting in laser reflection signals which are sampled and computed to attain a range value between the laser range finder and the object.

2. The method as defined in claim 1, wherein said step (B) includes the steps of:

(b1) emitting laser beams by the laser range finder at predetermined times;

(b2) finding the laser reflection signal of each emission at a sampling frequency Ts; and (b3) cumulating the laser reflection signals of each emission to determine a block in which the object is located.

3. The method as defined in claim 1, wherein said step (C) includes the steps of:
   (c1) emitting a laser beam and then sampling to obtain a laser reflection signal;
   (c2) emitting a laser beam at least at a predetermined delay time $T_k$ and then sampling to obtain a laser reflection signal, with the $T_k$ interval being smaller than the sampling interval Ts; and
   (c3) determining a range between the laser range finder and the object on the basis of the laser reflection signals of the step (c2).

4. The method as defined in claim 3, wherein said step (C) includes the emission of laser beams at a delay Ts/4 period each time to attain Ts, Ts/4, Ts/2 and 3Ts/4 laser emitting times, thereby resulting in laser reflection signals which are sampled, computed and compared to attain a range value having enhanced accuracy.

5. A signal processing method using a laser range finder to determine a distance to an object, said signal processing method comprising the steps of:
   (A) emitting a first succession of laser pulses toward the object with a timing such that a measuring time interval $T_t$ exists between successive laser pulses and emission of each laser pulse occurs at the start of a respective measuring time interval $T_t$;
   (B) dividing each measuring time interval $T_t$ into a fixed number of time blocks, each time block having a duration that is a fraction of the measuring time interval $T_t$;
   (C) detecting, at the range finder, light signals including reflections of the laser pulses and deriving a detection signal representative of the detected light signals;
   (D) sampling the detection signal at successive sampling times that occur at successive sampling time intervals $T_s$, each sampling time interval $T_s$ having a duration substantially shorter than the duration of each time block, to determine the time of detection of, and the time block associated with, each reflection of the laser pulses;
   (E) then emitting a second succession of laser pulses toward the object with a timing such that the measuring time interval $T_t$ exists between successive laser pulses, and the emission of each laser pulse is delayed from the start of a respective measuring time interval $T_t$ by a delay period;
   (F) detecting, at the range finder, light signals including reflections of the second succession of laser pulses and deriving a detection signal representative of the detected light signals;
   (G) sampling a portion of the detection signal derived in step (F) that is associated with light signals detected during each time block identified in step (D) to determine the time of detection of each reflection of the second succession of laser pulses; and
   (H) comparing the time of detection determinations effected in steps (D) and (G) to obtain a distance determination having enhanced accuracy.

6. The method as defined in claim 5, wherein said delay period has a duration equal to a fraction of the duration of each sampling time interval $T_s$.

7. The method as defined in claim 5, wherein said step (D) includes cumulating the detection time determinations associated with the first succession of laser pulses to determine the time block associated with reflections of the laser pulses.

8. The method as defined in claim 5, comprising the further steps, performed after step (G) and before step (H):
   emitting a third succession of laser pulses toward the object with a timing such that the time interval $T_t$ exists between successive laser pulses and emission of each laser pulse is delayed from the start of a respective time interval $T_t$ by a delay period having a duration equal to a fraction of the duration of each time interval $T_s$ and different from the delay period defined in step (E).

9. A laser range measurement device constructed for carrying out the method define in claim 5, comprising:
   a timing interval generator for generating system time pulses;
   a microprocessor unit connected with said timing interval generator;
   a programmable delay unit connected with said timing interval generator and said microprocessor unit and controlled by said microprocessor unit to determine the emission of a delay control signal;
   a laser transmitter connected with and controlled by said programmable delay unit to emit laser beams;
   a laser receiver for receiving reflected laser signals;
   a high gain amplifier circuit connected with said laser receiver for amplifying and tuning signals received by said laser receiver; and
   a memory connected with said microprocessor unit and a high speed shift register.

10. The laser range measurement device as defined in claim 9, further comprising a high speed shift register, which is connected with said timing interval generator and said high gain amplifier circuit, and a memory connected with microprocessor unit for calculation.

* * * * *